(12) United States Patent
Kosaki

(10) Patent No.: US 7,796,476 B2
(45) Date of Patent: Sep. 14, 2010

(54) OPTICAL DISK DEVICE AND OPTICAL DISK GAIN ADJUSTING METHOD

(75) Inventor: Masanori Kosaki, Kawasaki (JP)

(73) Assignee: Toshiba Samsung Storage Technology Corporation, Kawasaki-City (JP)

( * ) Notice: Subject to any disclaimer, the term of this patent is extended or adjusted under 35 U.S.C. 154(b) by 572 days.

(21) Appl. No.: 11/749,454

(22) Filed: May 16, 2007

(65) Prior Publication Data

US 2007/0274174 A1 Nov. 29, 2007

(30) Foreign Application Priority Data

May 25, 2006 (JP) ............................. 2006-145459

(51) Int. Cl.
*G11B 7/00* (2006.01)
(52) U.S. Cl. .............. 369/44.29; 369/44.36; 369/53.22
(58) Field of Classification Search ...................... None
See application file for complete search history.

(56) References Cited

U.S. PATENT DOCUMENTS

| | | | |
|---|---|---|---|
| 2002/0105865 A1* | 8/2002 | Kusumoto et al. | 369/44.29 |
| 2004/0076091 A1* | 4/2004 | Yonezawa | 369/44.29 |
| 2005/0105459 A1* | 5/2005 | Tamura et al. | 369/275.4 |
| 2005/0265185 A1* | 12/2005 | Kashihara et al. | 369/47.55 |
| 2006/0092782 A1* | 5/2006 | Takaba | 369/44.28 |
| 2007/0058502 A1* | 3/2007 | Huang et al. | 369/44.35 |

FOREIGN PATENT DOCUMENTS

| | | |
|---|---|---|
| CN | 1619657 A | 5/2005 |
| JP | 2002-288848 | 10/2002 |
| JP | 2003-217135 | 7/2003 |
| JP | 2005-267692 | 9/2005 |
| JP | 2006-59446 | 3/2006 |

* cited by examiner

*Primary Examiner*—Wayne R Young
*Assistant Examiner*—Brian Butcher
(74) *Attorney, Agent, or Firm*—Oblon, Spivak, McClelland, Maier & Neustadt, L.L.P.

(57) ABSTRACT

An optical disk device includes a optical pickup head which emits a laser beam to an optical disk and detects light reflected therefrom, a signal output unit which outputs at least a servo signal and RF signal in accordance with the detected light, a gain control unit which determines the type of the optical disk from identification information recorded thereon, and sets first and second adjusted gains for a data recorded region and data unrecorded region, when determining that the optical disk is of a type wherein a light reflectance is higher in the data recorded region than in the unrecorded region, and a gain adjustment unit including a memory storing the first and second adjusted gains, the gain adjustment unit adjusting the gain of the servo signal in the data recorded region, using the first adjusted gain, and in the data unrecorded region, using the second adjusted gain.

6 Claims, 6 Drawing Sheets

OPTICAL DISK DEVICE AND OPTICAL DISK GAIN ADJUSTING METHOD

CROSS-REFERENCE TO RELATED APPLICATIONS

This application is based upon and claims the benefit of priority from prior Japanese Patent Application No. 2006-145459, filed May 25, 2006, the entire contents of which are incorporated herein by reference.

BACKGROUND OF THE INVENTION

1. Field of the Invention

The present invention relates to an optical disk device wherein the gain of the device is adjustable in accordance with the reflection light of a laser beam emitted to an optical disk, and an optical disk gain adjusting method employed in the device.

2. Description of the Related Art

DVD-RAM optical disks, for example, have both a data recorded region and unrecorded region. Since in the DVD-RAMs, a laser beam is reflected with different reflectances from the data recorded region and unrecorded region, when a tracking error signal or focusing error signal is detected, different types of gain adjusting control are performed depending upon whether the error detection region is the data recorded region or unrecorded region.

Specifically, in DVD-RAMs, the reflectance of a laser beam is lower in a data recorded region than in a data unrecorded region. Accordingly, during DVD-RAM gain adjustment, the gain of an error signal detected in the data recorded region is increased, while that of an error signal detected in the data unrecorded region is decreased (see Jpn. Pat. Appln. KOKAI Publication No. 2002-288848).

As described above, in conventional optical disk devices, when accessing an arbitrary address position on an optical disk, it is determined whether data is recorded at the position. If it is determined that data is recorded, the gain of the acquired signal is increased in accordance with the reflectance at the address position, while if it is determined that no data is recorded, the gain of the signal is decreased in accordance with the reflectance at the address position.

This gain adjustment method cannot be applied to an optical disk that has characteristics different from those of a DVD-RAM. If the same gain adjustment as in a DVD-RAM is performed in an optical disk in which a laser beam exhibits a higher reflectance in a data recorded region than in a data unrecorded region, the gain of the high-level signal acquired from the data unrecorded region is further increased, and that of the low-level signal acquired from the data recorded region is further decreased. This destabilizes servo control using a tracking error signal or focusing error signal, resulting in a read error.

BRIEF SUMMARY OF THE INVENTION

According to an aspect of the present invention, there is provided an optical disk device comprising: a pickup head which emits a laser beam to an optical disk and detects light reflected from the optical disk; a signal output unit which outputs at least a servo signal and an RF signal in accordance with the light detected by the pickup head; a gain control unit which determines a type of the optical disk from identification information recorded on the optical disk, and sets a first adjusted gain for a data recorded region on the optical disk and a second adjusted gain greater than the first adjusted gain for a data unrecorded region on the optical disk, when determining that the optical disk is of a type in which a light reflectance is higher in the data recorded region than in the data unrecorded region; and a gain adjustment unit including a memory which stores the first and second adjusted gains set by the gain control unit, the gain adjustment unit adjusting a gain of the servo signal in the data recorded region, using the first adjusted gain, the gain adjustment unit adjusting the gain of the servo signal in the data unrecorded region, using the second adjusted gain.

According to another aspect of the present invention, there is provided an optical disk device comprising: a pickup head which emits a laser beam to an optical disk and detects light reflected from the optical disk; a signal output unit which outputs at least a servo signal and an RF signal in accordance with the light detected by the pickup head; a gain control unit which determines a type of the optical disk from identification information recorded on the optical disk, and sets a first type of adjusted gain which causes a data unrecorded region on the optical disk to provide a lower gain than a data recorded region on the optical disk, when determining that the optical disk is a first optical disk in which a light reflectance is lower in the data recorded region than in the data unrecorded region, the gain control unit setting a second type of adjusted gain which causes the data unrecorded region on the optical disk to provide a higher gain than the data recorded region on the optical disk, when determining that the optical disk is a second optical disk in which the light reflectance is higher in the data recorded region than in the data unrecorded region; and a gain adjustment unit including a memory which stores the first and second types of adjusted gains set by the gain control unit, the gain adjustment unit adjusting a gain of the servo signal in the first optical disk based on the second type of adjusted gain, the gain adjustment unit adjusting the gain of the servo signal in the second optical disk based on the second type of adjusted gain.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the invention will be described with reference to the accompanying drawings.

First Embodiment

Figure 1:
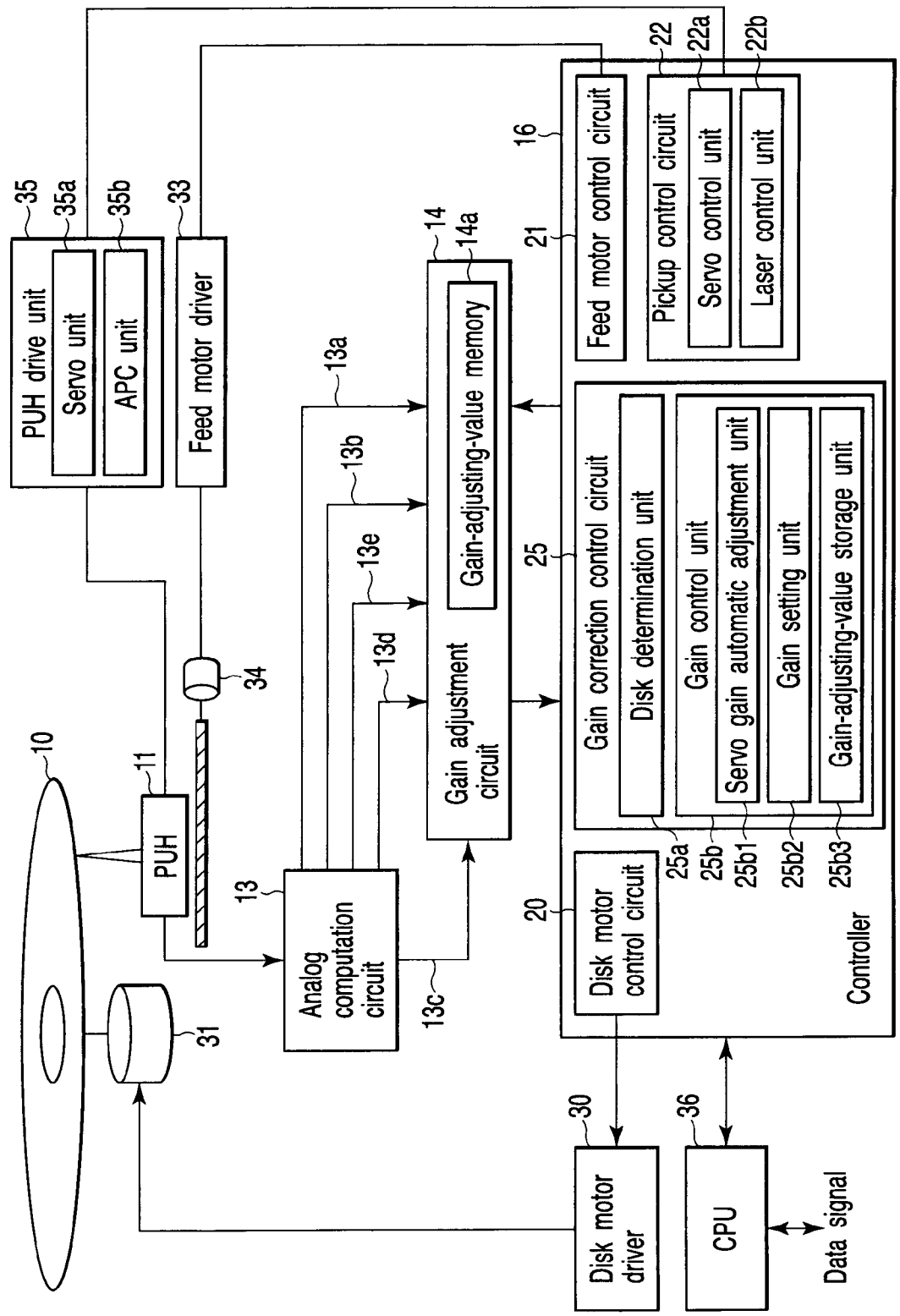
FIG. 1 is a block diagram illustrating the configuration of an optical disk device according to the invention.

FIG. 1 is a block diagram illustrating the configuration of an optical disk device according to the invention.

As shown, an optical disk 10 as a recording medium has a spiral track formed thereon, and is driven by a disk motor 31. In the optical disk device of the invention, assume that a compact disk (CD), digital versatile disk (DVD) or high-definition DVD (HD-DVD) can be used as the optical disk 10.

DVD-RAMs included in DVD disks have both a data recorded region and data unrecorded region. In the DVD-RAMs, the reflectance of a laser beam is lower in the data recorded region than in the data unrecorded region. The disk, in which the reflectance of a laser beam is lower in the data recorded region than in the data unrecorded region, will hereinafter be referred to as "the H-to-L disk".

HD-DVD-RW disks included in HD-DVD disks also have a data recorded region and data unrecorded region. However, in the HD-DVD-RW disks, the reflectance of a laser beam is higher in the data recorded region than in the data unrecorded region. The disk, in which the reflectance of a laser beam is higher in the data recorded region than in the data unrecorded region, will hereinafter be referred to as "the L-to-H disk".

Recording and reproducing of data to and from the optical disk 10 is performed using a laser beam output from a optical pickup head (PUH) 11. The optical pickup head 11 is supported by a feed motor 34, opposing the recording surface of the optical disk 10, so that it is radially movable with respect to the optical disk 10.

The optical pickup head 11 comprises a laser diode, collimator lens, beam splitter, object lens, cylindrical lens, photodetector, lens position sensor and monitor diode, etc.

The optical pickup head 11 also comprises a focusing actuator and tracking actuator. The focusing actuator includes a two-axis actuator for moving the object lens in two directions perpendicular to each other, and moves the object lens in the direction of focusing (in the direction along the optical axis of the lens) to bring the lens into focus. The tracking actuator moves the object lens in the direction of tracking (in the radial direction of the optical disk 10) to adjust tracking. Further, the focusing actuator is controlled by a focusing drive signal output from a servo unit 35a incorporated in a PUH drive unit 35, described later. The tracking actuator is controlled by a tracking drive signal also output from the servo unit 35a of the PUH drive unit 35.

The laser diode of the optical pickup head 11 is driven by the auto power control (APC) unit 35b of the PUH drive unit 35 under the control of a pickup control circuit 22 incorporated in the controller 16, thereby outputting a laser beam. The laser beam output from the laser diode is guided to the optical disk 10 via the collimator lens, beam splitter and object lens.

In the optical disk device of the embodiment, the optical pickup head 11 is provided with a plurality of laser diodes, and hence can output laser beams of different wavelengths for different recording media. Specifically, an infrared laser for CDs outputs a beam of 780 nm, a red laser for DVDs outputs a beam of 650 nm, and a blue laser for HD-DVDs outputs a beam of 405 nm. Under the control of the pickup control circuit 22 of the controller 16, the PUH drive unit 35 drives the one of the laser diodes corresponding to the recording medium to apply a laser beam to the optical disk 10.

The laser beam output from the driven laser diode is guided to the recording surface of the optical disk 10 via the collimator lens, beam splitter and object lens. The laser beam reflected from the recording surface of the optical disk 10 is guided to the photodetector of the optical pickup head 11 via the object lens, beam splitter and cylindrical lens of the optical pickup head 11. The photodetector is, for example, a four-piece detection circuit. Specifically, the photodetector is divided into four light-receiving surfaces, i.e., a first quadrant surface A, second quadrant surface C, third quadrant surface D and fourth quadrant surface B, the first and fourth quadrant surfaces A and B (and second and third quadrant surfaces C and D) being positioned in the tangential direction of the optical disk 10. The photodetector receives the light reflected from the optical disk 10, using the light-receiving surfaces A, B, C and D, converts, into voltage signals A, B, C and D, the currents corresponding to the intensity levels of the received light components, and outputs the signals to an analog computation circuit 13.

The analog computation circuit 13 processes the four detection signals (A, B, C and D) output from the four-piece photodetector, and outputs first to fifth signals to a gain adjustment circuit 14. The first signal is a tracking error signal 13a indicating the error between the center of the laser beam spot and the center of the track. The tracking error signal 13a is acquired by, for example, the computation of (A+B)−(C+D). The second signal is a focusing error signal 13b indicating the error from a just focused state. The focusing error signal 13b is acquired by, for example, the computation of (A+C)−(B+D). The third signal is an RF signal (high-frequency signal) 13c, and is acquired by, for example, causing the signal acquired by the computation of (A+B+C+D)×2 to pass through a high-pass filter. The fourth signal is a wobble signal 13d having its level varied in accordance with a wobbled groove formed in the optical disk 10. The fifth signal is a focusing sum signal 13e for determining whether focus is realized. The focusing sum signal 13e is acquired by, for example, causing the signal acquired by the computation of (A+B+C+D)×2 to pass through a low-pass filter.

The gain adjustment circuit 14 adjusts the gain of each of the signals 13a to 13e output from the analog computation circuit 13. Namely, the gain adjustment circuit 14 increases or decreases the gain of each of the signals 13a to 13e output from the analog computation circuit 13 in accordance with the control of a gain correction control circuit 25 incorporated in the controller 16.

The controller 16 includes a processor and memories (such as a RAM and ROM), and entirely controls the optical disk device by executing various programs stored in the memories, using the processor. The controller 16 further includes a disk motor control circuit 20, feed motor control circuit 21, pickup control circuit 22 and gain correction control circuit 25, etc.

The disk motor control circuit 20 controls the rotation of the disk motor 31 via a disk motor driver 30. The disk motor 31 is, for example, a spindle motor.

The feed motor control circuit 21 controls the rotation of the feed motor 34 via a feed motor driver 33 to thereby radially move the optical pickup head 11 on the optical disk 10. The feed motor 34 is, for example, a stepping motor.

The pickup control circuit 22 controls the optical pickup head 11 via the PUH drive unit 35. The pickup control circuit 22 comprises a servo control unit 22a for realizing tracking servo control and focusing servo control, and a laser control unit 22b for causing each laser diode of the optical pickup head 11 to output a laser beam. The servo control unit 22a drives the actuator of the optical pickup head 11 via the servo unit 35a of the PUH drive unit 35. The laser control unit 22b controls, via the APC unit 35b of the PUH drive unit 35, the switching on and off of the laser output of the optical pickup head 11, and the intensity of the laser beam during reproduction and recording.

The servo control unit 22a of the pickup control circuit 22 causes the servo unit 35a of the PUH drive unit 35 to output a tracking drive signal in accordance with the tracking error signal 13a supplied from the gain adjustment circuit 14, thereby driving the tracking actuator of the optical pickup head 11. Thus, the pickup control circuit 22 realizes tracking servo control for causing a laser beam output from the optical pickup head 11 to trace each track formed on the optical disk 10.

The servo control unit 22a of the pickup control circuit 22 also causes the servo unit 35a of the PUH drive unit 35 to output a focusing drive signal in accordance with the focusing error signal 13b and focusing sum signal 13e supplied from the gain adjustment circuit 14, thereby driving the focusing actuator of the optical pickup head 11. Thus, the pickup control circuit 22 realizes focusing servo control for causing a laser beam output from the optical pickup head 11 to correctly converge on the recording surface of the optical disk 10.

The gain correction control circuit 25 controls the gain adjustment circuit 14 for adjusting the gains of the signals 13a to 13e supplied from the analog computation circuit 13. In the embodiment, the gain correction control circuit 25 firstly determines whether the optical disk 10 is the H-to-L disk in which the reflectance of a laser beam is lower in a data recorded region than in a data unrecorded region, or the L-to-H disk in which the reflectance of the laser beam is higher in the data recorded region than in the data unrecorded region. After that, the gain correction control circuit 25 determines whether the to-be-read region of the optical disk 10 is the data recorded region or unrecorded region, and sets an adjusted gain in a gain-adjusting-value memory 14a of the gain adjustment circuit 14 in accordance with the determination result.

To realize the above, the gain correction control circuit 25 includes a disk determination unit 25a and gain control unit 25b. The disk determination unit 25a determines whether the optical disk 10 is the H-to-L disk or L-to-H disk. Upon receiving the determination result of the disk determination unit 25a, the gain control unit 25b stores an appropriately adjusted gain in the gain-adjusting-value memory 14a of the gain adjustment circuit 14.

A CPU 36 controls the controller 16. The data read from the optical disk 10 and to be written thereto is transferred between the CPU 36 and controller 16.

Figure 2:
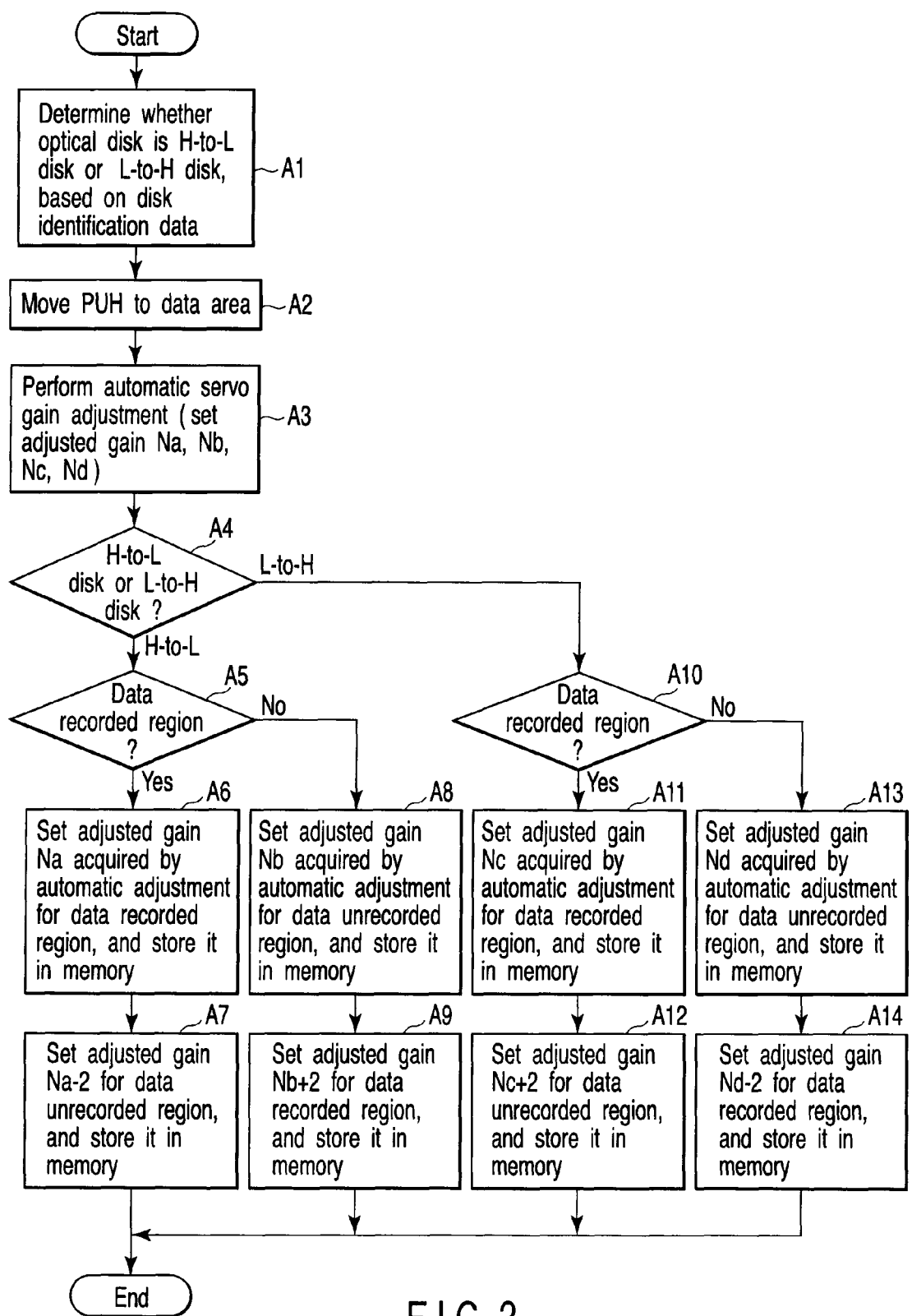
FIG. 2 is a flowchart illustrating an gain-adjusting-value-setting process employed in a first embodiment of the invention.

Referring to FIG. 2, the operation of the optical disk device according to the first embodiment will be described. FIG. 2 is a flowchart illustrating an gain-adjusting-value-setting process employed in the first embodiment.

In the first embodiment, the controller 16 determines whether the optical disk 10 is the H-to-L disk or L-to-H disk, and controls, in accordance with the determination result, gain adjustment concerning the signals detected in a data recorded region and unrecorded region.

In the gain-adjusting-value-setting process shown in FIG. 2, the controller 16 performs the following. Firstly, it determines whether the optical disk 10 is the H-to-L disk or L-to-H disk. Subsequently, it determines whether the to-be-read region of the optical disk 10, to which a laser beam from the optical pickup head 11 is applied, is a data recorded region or unrecorded region. Based on these determination results, the adjusted gain acquired by gain adjustment is stored in the gain-adjusting-value memory 14a of the gain adjustment circuit 14.

Assume here that in the first embodiment, identification data for identifying the type of the optical disk 10 is prestored in the disk. Specifically, the identification data is stored in a burst cutting area (BCA) or system lead-in area incorporated in the disk.

When the optical disk 10 is loaded in the drive, the optical disk device reads the identification data from the BCA or system lead-in area of the disk. Based on the identification data read from the disk, the disk determination unit 25a of the gain correction control circuit 25 determines whether the loaded optical disk 10 is the H-to-L disk or L-to-H disk (step A1).

Note that a memory (not shown) incorporated in the controller 16 prestores disk type data that indicates whether each currently available optical disk is the H-to-L disk or L-to-H disk. The disk determination unit 25a compares the identification data read from the loaded optical disk 10 with the disk type data to thereby determine whether the loaded optical disk 10 is the H-to-L disk or L-to-H disk.

After that, the feed motor control circuit 21 of the controller 16 drives the feed motor 34 via the feed motor driver 33, thereby moving the optical pickup head 11 to the position corresponding to any one of the data areas defined on the optical disk 10 (step A2). When the optical pickup head 11, positioned at the data area, emits a sine wave (laser beam) of a preset frequency, the controller 16 (servo gain automatic adjustment unit 25b1) reads the light reflected from the disk to thereby execute initial servo gain adjustment (focusing/tracking) and set an adjusted gain. Further, the controller 16 (gain setting unit 25b2) stores, in the gain-adjusting-value memory 14a, the set adjusted gain (for example, Na, Nb, Nc or Nd [dB]) (step A3). Since the automatic servo gain adjustment operation is performed by a known technique, it is not described.

Thereafter, the controller 16 determines whether the to-be-read region of the optical disk 10, to which the laser beam from the optical pickup head 11 is applied, is a data recorded region or unrecoded region. For instance, the controller 16 receives, via the gain adjustment circuit 14, an RF signal 13c output from the analog computation circuit 13, and executes the above determination based on the amplitude of the RF signal 13c. Namely, if the amplitude of the RF signal 13c is larger than a preset reference value, the to-be-read region is determined to be the data recorded region, whereas if the amplitude is not larger than the reference value, the to-be-read region is determined to be the data unrecorded region (steps A5 and A10). Another method can be used for the determination concerning the data recorded region and unrecorded region.

If it is determined at step A1 that the optical disk 10 is the H-to-L disk (the result at step A4 is the H-to-L disk), and if automatic servo gain adjustment is performed on a data recorded region at step A3 (assume that the adjusted gain acquired at this time is Na [dB]), the gain control unit 25b performs control to store, in the gain-adjusting-value memory 14a, the adjusted gain Na [dB] for the data recorded region in the H-to-L disk (step A6).

Further, for a data unrecorded region in the H-to-L disk, the gain control unit 25b performs control to store, in the gain-adjusting-value memory 14a, an adjusted gain of Na−2 [dB], which is lower by 2 [dB] than Na (step A7).

Similarly, if it is determined at step A1 that the optical disk 10 is the H-to-L disk (the result at step A4 is the H-to-L disk), and if automatic servo gain adjustment is performed on a data unrecorded region at step A3 (assume that the adjusted gain acquired at this time is Nb [dB], Nb<Na), the gain control unit 25b performs control to store, in the gain-adjusting-value memory 14*a*, the adjusted gain Nb [dB] for the data unrecorded region in the H-to-L disk (step A8).

Furthermore, for a data recorded region in the H-to-L disk, the gain control unit 25*b* performs control to store, in the gain-adjusting-value memory 14*a*, an adjusted gain of Nb+2 [dB], which is higher by 2 [dB] than Nb (step A9).

Namely, the adjusted gain of Na is equal to Nb+2, and the adjusted gain of Na−2 is equal to Nb. This means that in the H-to-L disk, adjustment is performed using a higher adjusted gain in the data recorded region than in the data unrecorded region. The adjusted gains Na and Nb will be referred to as first-type adjusted gains.

In contrast, if it is determined at step A1 that the optical disk 10 is the L-to-H disk (the result at step A4 is the L-to-H disk), and if automatic servo gain adjustment is performed on a data recorded region at step A3 (assume that the adjusted gain acquired at this time is Nc [dB]), the gain control unit 25*b* performs control to store, in the gain-adjusting-value memory 14*a*, the adjusted gain Nc [dB] for the data recorded region in the L-to-H disk (step A11).

Further, for a data unrecorded region in the L-to-H disk, the gain control unit 25*b* performs control to store, in the gain-adjusting-value memory 14*a*, an adjusted gain of Nc+2 [dB], which is higher by 2 [dB] than Nc (step A12).

Similarly, if it is determined at step A1 that the optical disk 10 is the L-to-H disk (the result at step A4 is the L-to-H disk), and if automatic servo gain adjustment is performed on a data unrecorded region at step A3 (assume that the adjusted gain acquired at this time is Nd [dB], Nd>Nc), the gain control unit 25*b* performs control to store, in the gain-adjusting-value memory 14*a*, the adjusted gain Nd [dB] for the data unrecorded region in the L-to-H disk (step A13).

Furthermore, for a data recorded region in the L-to-H disk, the gain control unit 25*b* performs control to store, in the gain-adjusting-value memory 14*a*, an adjusted gain of Nd−2 [dB], which is lower by 2 [dB] than Nd (step A14).

Namely, the adjusted gain of Nc is equal to Nd−2, and the adjusted gain of Nc+2 is equal to Nd. This means that in the L-to-H disk, adjustment is performed using a higher adjusted gain in the data unrecorded region than in the data recorded region. The adjusted gains Nc and Nd will be referred to as second-type adjusted gains. In addition, although the first embodiment employs fixed correction values of ±2, the correction values are not limited to them. It is sufficient if appropriate correction values (about 2 to 4 dB) are set for a designed ideal servo gain.

As described above, an appropriately adjusted servo gain can be stored in the gain-adjusting-value memory 14*a* regardless of whether the optical disk 10 is the L-to-H disk or H-to-L disk, or whether the to-be-read region is a data recorded region or unrecorded region.

Figure 3:
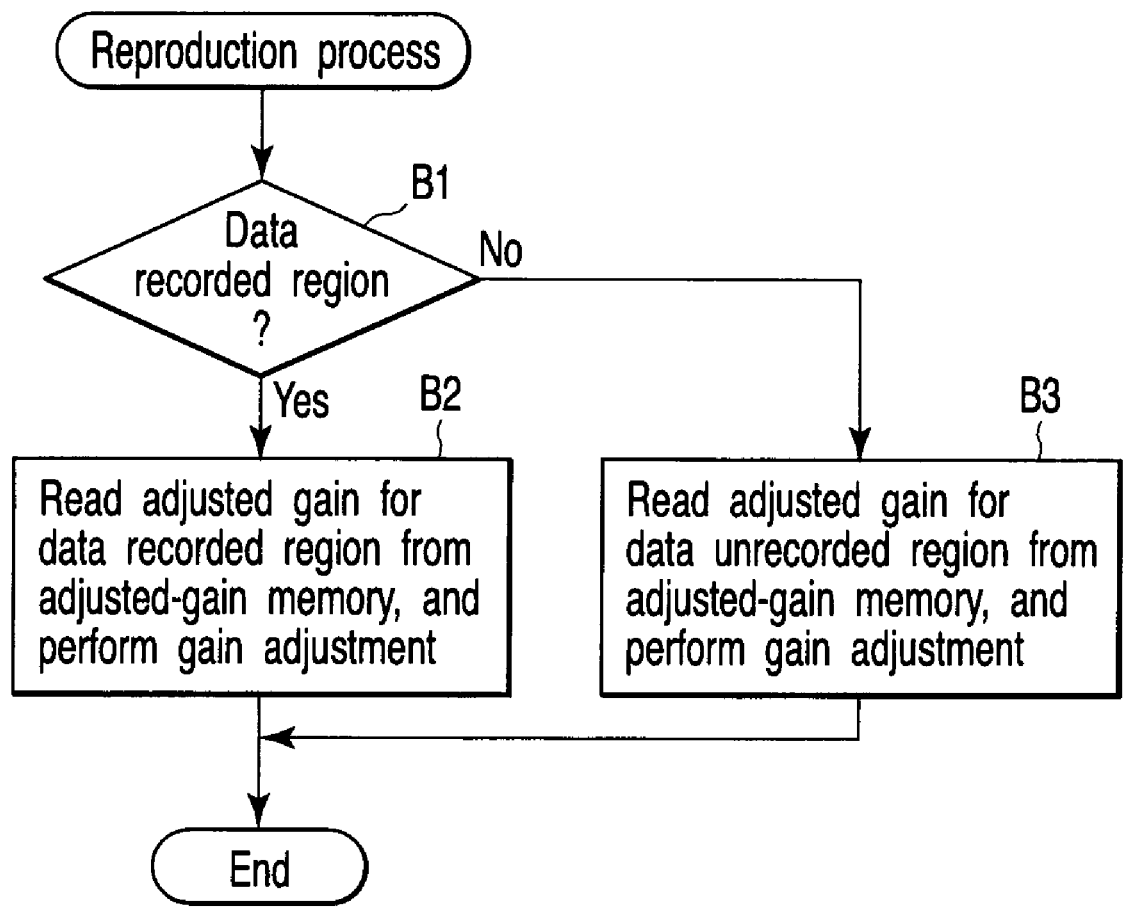
FIG. 3 is a flowchart illustrating a reproduction process employed in the first embodiment of the invention.

Referring to the flowchart of FIG. 3, a description will be given of the reproduction process performed by the optical disk device in which an adjusted servo gain is set as described above.

In the optical disk device, when reproducing data recorded on the optical disk 10, the gain adjustment circuit 14 performs gain adjustment on the signal output from the analog computation circuit 13, based on the adjusted servo gain set in the gain-adjusting-value memory 14*a*.

Specifically, when data is read from a data recorded region (Yes at step B1), the gain adjustment circuit 14 performs gain adjustment on, for example, the servo signals (i.e., the tracking signal 13*a* and focusing error signal 13*b*) generated by the analog computation circuit 13 from the read data, based on the adjusted servo gain set in the gain-adjusting-value memory 14*a* (step B2).

Similarly, when data is read from a data unrecorded region (No at step B1), the gain adjustment circuit 14 performs gain adjustment on, for example, the servo signals (i.e., the tracking signal 13*a* and focusing error signal 13*b*) generated by the analog computation circuit 13 from the read data, based on the adjusted servo gain set in the gain-adjusting-value memory 14*a* (step B3).

In the H-to-L disks, a laser beam is reflected with a lower reflectance from a data recorded region than from a data unrecorded region. Therefore, if it is determined that the optical disk 10 is the H-to-L disk, gain adjustment is performed using a higher adjusted gain in the data recorded region than in the data unrecorded region, referring to the gain-adjusting-value memory 14*a*.

In contrast, in the L-to-H disks, a laser beam is reflected with a higher reflectance from a data recorded region than from a data unrecorded region. Therefore, if it is determined that the optical disk 10 is the L-to-H disk, gain adjustment is performed using a lower adjusted gain in the data recorded region than in the data unrecorded region, referring to the gain-adjusting-value memory 14*a*.

The tracking error signal 13*a* and focusing error signal 13*b* gain-adjusted by the gain adjustment circuit 14 are output to the controller 16. Thus, the controller 16 receives the signal having its gain adjusted in accordance with the region to which the optical pickup head 11 applies a laser beam, and hence can perform reliable servo control.

In the optical disk device of the first embodiment, an appropriately adjusted gain can be set in accordance with the type of the loaded optical disk 10 (regardless of whether the disk 10 is the H-to-L or the L-to-H disk), and in accordance with the to-be-read region (regardless of whether the region is a data recorded region or unrecorded region). Accordingly, the gain adjustment circuit 14 can perform appropriate gain adjustment on each signal output from the analog computation circuit 13.

Further, in the first embodiment, the adjusted gain acquired at step A3 by automatic servo gain adjustment is stored in the gain-adjusting-value memory 14*a* for all data recorded regions or all data unrecorded regions. For setting an adjusted gain in the gain-adjusting-value memory 14*a* of the gain adjustment circuit 14, if the optical disk 10 is the H-to-L disk, steps A6 and A7 or steps A8 and A9 in FIG. 2 are executed. Namely, when the initial servo gain operation is performed on a data recorded region, steps A6 and A7 are executed, whereas when it is performed on a data unrecorded region, steps A8 and A9 are executed.

On the other hand, if the optical disk 10 is the L-to-H disk, steps A11 and A12 or steps A13 and A14 in FIG. 2 are executed. Namely, when the initial servo gain operation is performed on a data recorded region, steps A11 and A12 are executed, whereas when it is performed on a data unrecorded region, steps A13 and A14 are executed.

This being so, in the first embodiment, the gain adjustment time can be shorted, compared to the case where gain adjustment is performed on a data recorded region and unrecorded region using different adjusted gains.

Further, the adjusted gain acquired at step A3 by automatic servo gain adjustment is effective for the signal detected in the region irradiated with a laser beam emitted from the optical pickup head 11. Therefore, even if it is detected later that both a data recorded region and unrecorded region exit, more stabilized servo control can be realized than in the case where no gain adjustment is executed, since gain adjustment is already executed on the signal detected in at least one of those regions.

In the first embodiment, an adjusted gain acquired by automatic servo gain adjustment, and values computed from the adjusted gain, are stored in the gain-adjusting-value memory 14a. Alternatively, a plurality of adjusted gains corresponding to different types of optical disks 10 may be prestored in the controller 16 (gain-adjusting-value storage unit 25b3), and the adjusted gain corresponding to a loaded optical disk 10 may be selected from the controller 16.

For instance, in the case of disks of different reflectances, such as a DVD-R and DVD-RW, different appropriate gains must be set for a data recorded region and unrecorded region. In light of this, adjusted gains corresponding to the different specifications of disks (those of, for example, a DVD-R and DVD-RW) may be set and stored in the controller 16. Alternatively, adjusted gains corresponding to identification data (ID), such as disk makers and replay speed, recorded on disks may be set and stored in the controller 16.

As described above, more appropriate gain adjustment can be performed by preparing adjusted gains corresponding to the types of optical disks 10, and executing gain adjustment using the adjusted gain corresponding to each type.

Second Embodiment

In the first embodiment, respective adjusted gains are set in the gain adjustment circuit 14 for a data recorded region and unrecorded region. On the other hand, in a second embodiment, only one adjusted gain (i.e., the middle value of the adjusted gains for the data recorded region and unrecorded region) is set.

Figure 4:
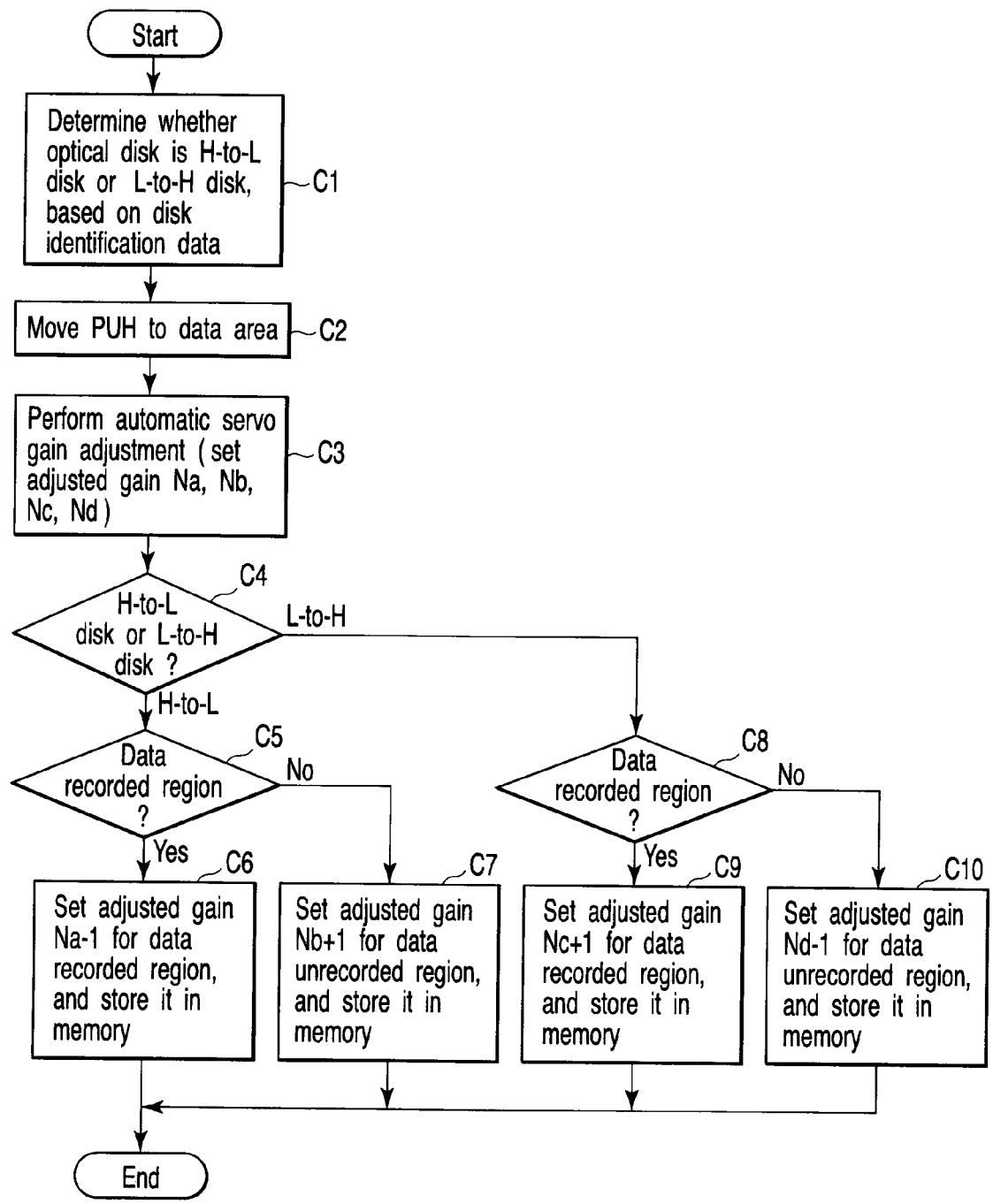
FIG. 4 is a flowchart illustrating an gain-adjusting-value-setting process employed in a second embodiment of the invention.

Referring to the flowchart of FIG. 4, the gain-adjusting-value-setting process performed in the second embodiment will be described.

Since steps C1 to C5 and C8 in FIG. 4 correspond to steps A1 to A5 and A10 in FIG. 2, no description will be given thereof.

If it is determined at step C1 that the optical disk 10 is the H-to-L disk (the result at step C4 is the H-to-L disk), and if automatic servo gain adjustment is performed on a data recorded region at step C3 (assume that the adjusted gain acquired at this time is Na [dB]), the gain control unit 25b performs control to store, in the gain-adjusting-value memory 14a, an adjusted gain of Na−1 [dB] for all data recorded regions and unrecorded regions (step C6).

Similarly, if it is determined at step C1 that the optical disk 10 is the H-to-L disk (the result at step C4 is the H-to-L disk), and if automatic servo gain adjustment is performed on a data unrecorded region at step C3 (assume that the adjusted gain acquired at this time is Nb [dB], Nb<Na), the gain control unit 25b performs control to store, in the gain-adjusting-value memory 14a, an adjusted gain of Nb+1 [dB] for all data unrecorded regions and data recorded regions (step C7).

The adjusted gain Na−1 and adjusted gain Nb+1 are equal to each other, and are the middle value of the adjusted gain Na for the data recorded region and the adjusted gain Nb for the data unrecorded region in the first embodiment.

Namely, at this stage, if the loaded optical disk 10 is the H-to-L disk, gain adjustment is performed using the middle value (in the above example, Na−1 or Nb+1), regardless of whether the to-be-read region is the data recorded region or unrecorded region.

In contrast, if it is determined at step C1 that the optical disk 10 is the L-to-H disk (the result at step C4 is the L-to-H disk), and if automatic servo gain adjustment is performed on a data recorded region at step C3 (assume that the adjusted gain acquired at this time is Nc [dB]), the gain control unit 25b performs control to store, in the gain-adjusting-value memory 14a, an adjusted gain of Nc+1 [dB] for all data recorded regions and unrecorded regions (step C9).

Similarly, if it is determined at step C1 that the optical disk 10 is the L-to-H disk (the result at step C4 is the L-to-H disk), and if automatic servo gain adjustment is performed on a data unrecorded region at step C3 (assume that the adjusted gain acquired at this time is Nd [dB], Nd>Nc), the gain control unit 25b performs control to store, in the gain-adjusting-value memory 14a, an adjusted gain of Nd−1 [dB] for all data unrecorded regions and data recorded regions (step C10).

The adjusted gain Nc+1 and adjusted gain Nd−1 are equal to each other, and are the middle value of the adjusted gain Nd for the data recorded region and the adjusted gain Nb for the data unrecorded region in the first embodiment.

Namely, at this stage, if the loaded optical disk 10 is the L-to-H disk, gain adjustment is performed using the middle value (in the above example, Nc+1 or Nd−1), regardless of whether the to-be-read region is the data recorded region or unrecorded region.

Thus, the middle adjusted servo gain value can be stored in the gain-adjusting-value memory 14a, regardless of whether the optical disk 10 is the L-to-H disk or H-to-L disk, or whether the to-be-read region is the data recorded region or unrecorded region.

Figure 5:
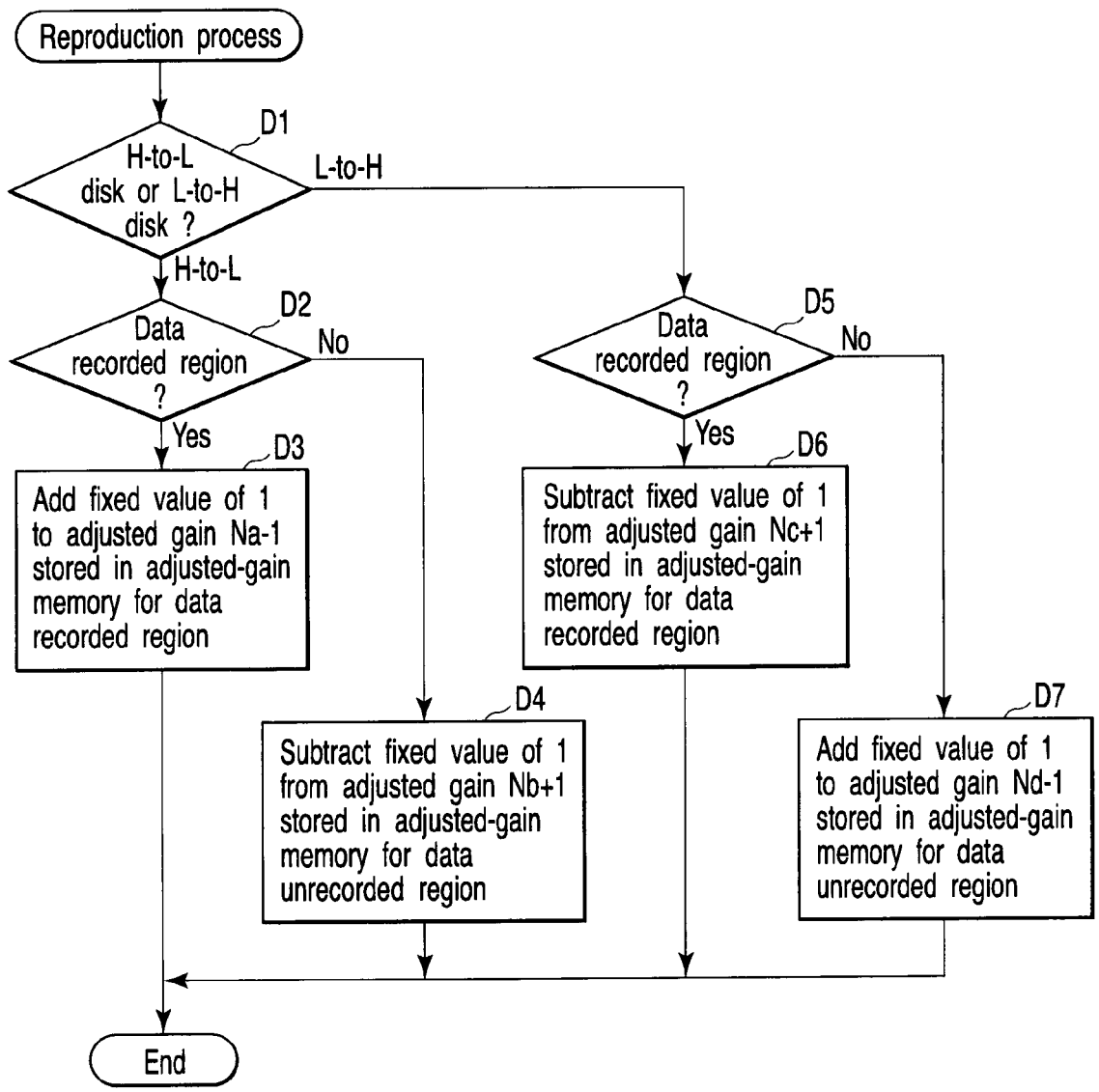
FIG. 5 is a flowchart illustrating a reproduction process employed in the second embodiment of the invention.

Referring to the flowchart of FIG. 5, the reproduction process performed in the second embodiment will be described.

In the optical disk device, when reproducing data recorded on the optical disk 10, the gain adjustment circuit 14 performs gain adjustment on servo signals, such as the tracking error signal 13a and focusing error signal 13b, output from the analog computation circuit 13, based on the adjusted servo gain set in the gain-adjusting-value memory 14a.

Specifically, if it is determined that the optical disk 10 is the H-to-L disk (the result at step D1 is the H-to-L disk), and if data is read from a data recorded region (Yes at step D2), the gain adjustment circuit 14 performs gain adjustment on, for example, the servo signals (i.e., the tracking error signal 13a and focusing error signal 13b) generated by the analog computation circuit 13 from the read data, based on a value (Na−1+1) obtained by increasing, by, for example, +1 dB, the middle adjusted servo gain set in the gain-adjusting-value memory 14a for the data recorded region (step D3).

If data is read from a data unrecorded region (No at step D2), the gain adjustment circuit 14 performs gain adjustment on, for example, the servo signals (i.e., the tracking error signal 13a and focusing error signal 13b) generated by the analog computation circuit 13 from the read data, based on a value (Nb+1−1) obtained by decreasing, by, for example, −1 dB, the middle adjusted servo gain set in the gain-adjusting-value memory 14a for the data unrecorded region (step D4). As described above, the correction values Na and Nb satisfy Na>Nb as in the first embodiment.

In the H-to-L disks, a laser beam is reflected with a lower reflectance from a data recorded region than from a data unrecorded region. Therefore, if it is determined that the optical disk 10 is the H-to-L disk, gain adjustment is performed using a higher adjusted gain in the data recorded region than in the data unrecorded region, based on the above correction values.

In contrast, if it is determined that the optical disk 10 is the L-to-H disk (the result at step D1 is the L-to-H disk), and if data is read from a data recorded region (Yes at step D5), the gain adjustment circuit 14 performs gain adjustment on, for example, the servo signals generated by the analog computation circuit 13 from the read data, based on a value (Nc+1−1) obtained by decreasing, by, for example, −1 dB, the middle adjusted servo gain set in the gain-adjusting-value memory 14a for the data recorded region (step D6).

If data is read from a data unrecorded region (No at step D5), the gain adjustment circuit 14 performs gain adjustment on, for example, the servo signals generated by the analog computation circuit 13 from the read data, based on a value (Nd−1+1) obtained by increasing, by, for example, +1 dB, the middle adjusted servo gain set in the gain-adjusting-value memory 14a for the data unrecorded region (step D7). As described above, the correction values Nc and Nd satisfy Nc<Nd as in the first embodiment.

In the L-to-H disks, a laser beam is reflected with a higher reflectance from a data recorded region than from a data unrecorded region. Therefore, if it is determined that the optical disk 10 is the L-to-H disk, gain adjustment is performed using a lower adjusted gain in the data recorded region than in the data unrecorded region, based on the above correction values.

As described above, in the optical disk device of the second embodiment, a single adjusted value (fixed value) corresponding to the type of each disk (the H-to-L disk or L-to-H disk) is acquired, and respective adjusted gains for a data recorded region and unrecorded region are set by correcting the adjusted value using respective correction values (positive and negative correction values). Thus, the gain adjustment circuit 14 can appropriately perform gain adjustment on each signal output from the analog computation circuit 13.

In the above description, the adjusted value obtained by automatic servo gain adjustment performed in a data recorded region (or unrecorded region) is corrected, and the corrected single adjusted value (middle value) is used for both the data recorded region and unrecorded region. The other adjusted value obtained by automatic servo gain adjustment performed in a data unrecorded region (or data recorded region) may be used for both the data recorded region and unrecorded region.

For instance, a single adjusted value obtained by automatic servo gain adjustment performed in a data recorded region or unrecorded region is stored, and is increased or decreased depending upon whether the to-be-read region is the data recorded region or unrecorded region. The resultant adjusted value is stored in the gain-adjusting-value memory 14a. The range of increase or decrease is set appropriately in accordance with the type of disk or circuit configuration, etc.

Third Embodiment

In the first and second embodiments, the controller 16 determines from the identification data recorded on the optical disk 10 whether the optical disk 10 is the H-to-L disk or L-to-H disk. In a third embodiment, a description will be given of gain adjustment performed when the identification data recorded on the BCA or system lead-in area is not read or cannot be read.

In the third embodiment, the determination as to whether the loaded optical disk 10 is the H-to-L disk or L-to-H disk is performed by, for example, detecting, in each of a data recorded region and unrecorded region, the amplitude of a tracking error signal in a track hold state (in which the laser beam emitted from the optical pickup head 11 traces a track and jumps to the previous position of the track each time it rotates through one circle) upon jumping to the previous position, and comparing the detected amplitudes.

Figure 6:
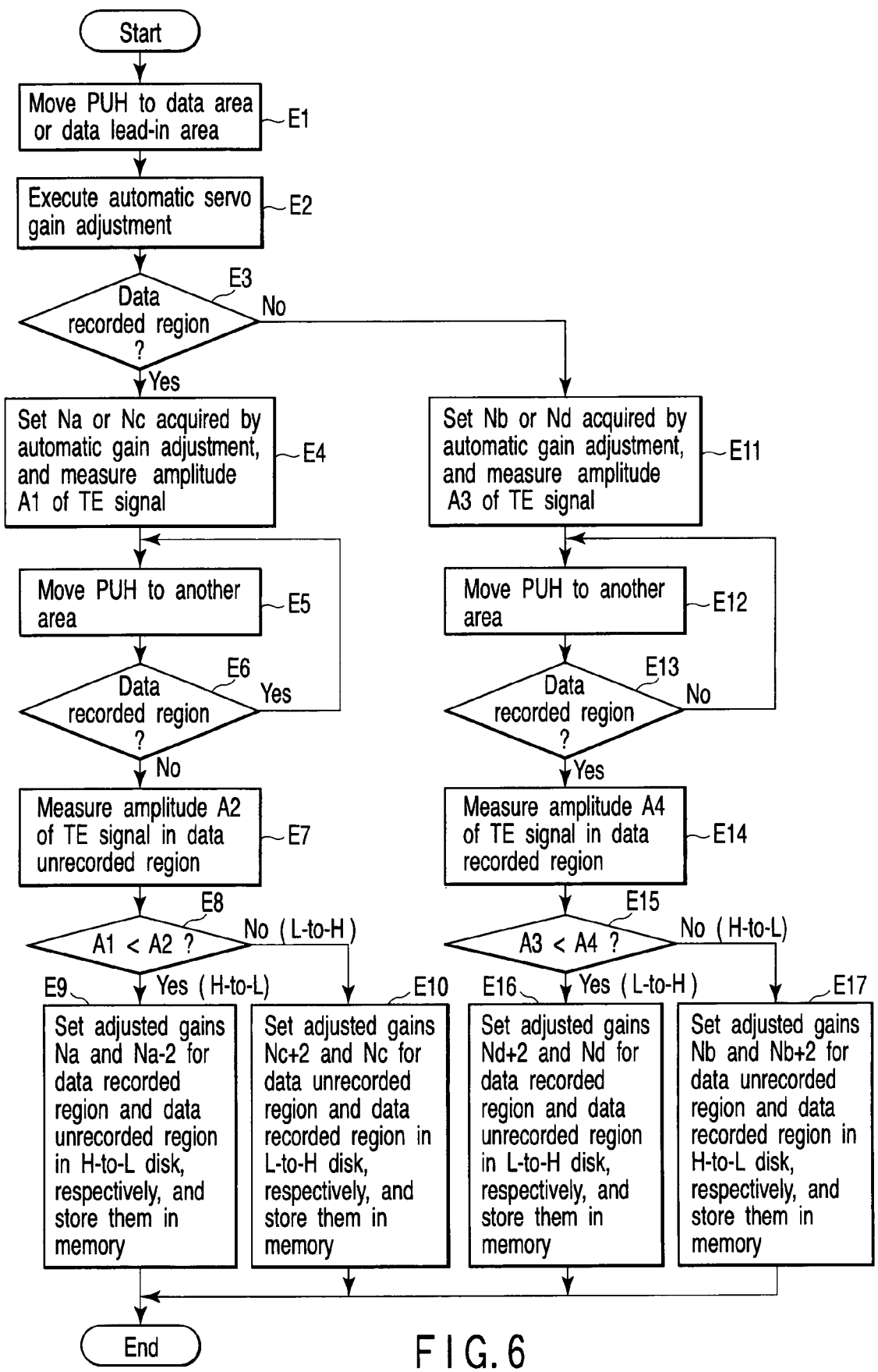
FIG. 6 is a flowchart illustrating an gain-adjusting-value-setting process employed in a third embodiment of the invention.

Referring to the flowchart of FIG. 6, the gain-adjusting-value-setting process performed in the third embodiment will be described.

Firstly, the feed motor control circuit 21 of the controller 16 drives the feed motor 34 via the feed motor driver 33 to move the optical pickup head 11 to the position on the optical disk 10 that corresponds to the data area or lead-in area (step E1).

In this state, the controller 16 determines whether the position at which a laser beam is emitted from the optical pickup head 11 corresponds to a data recorded region or unrecorded region. For instance, the controller 16 receives, via the gain adjustment circuit 14, the RF signal 13c output from the analog computation circuit 13, and determines from the amplitude of the RF signal 13c whether the position corresponds to the data recorded region or unrecorded region. Namely, if the amplitude of the RF signal 13c is greater than a preset reference value, the controller 16 determines that the position corresponds to the data recorded region. In contrast, if the amplitude of the RF signal 13c is not greater than the preset reference value, the controller 16 determines that the position corresponds to the data unrecorded region. Another method can be used for the determination.

Subsequently, the controller 16 executes automatic servo gain adjustment in an arbitrary position on the optical disk 10, as in the first embodiment (step E2).

If the region subjected to the automatic servo gain adjustment is a data recorded region (Yes at step E3), the gain control unit 25b of the gain correction control circuit 25 performs control to temporarily store, in the gain-adjusting-value memory 14a, the acquired adjusted gain (assume that it is Na or Nc). Further, the disk determination unit 25a of the gain correction control circuit 25 instructs the pickup control circuit 22 to cause the optical pickup head 11 to perform track holding. The gain adjustment circuit 14 measures the amplitude A1 of the tracking error signal 13a from the analog computation circuit 13 when the optical pickup head 11 performs track holding, and stores it therein (step E4).

After that, the controller 16 drives the feed motor 34 via the feed motor driver 33 to move the optical pickup head 11 (step E5). At this time, the controller 16 determines, in the same manner as the above, whether the position at which the optical pickup head 11 emits a laser beam corresponds to a data recorded region or unrecorded region (step E6). The controller 16 moves the optical pickup head 11 until the data unrecorded region is detected, i.e., iterates steps E5 and E6. Instead of executing steps E5 and E6, monitoring may be performed during a normal operation until the data unrecorded region is detected.

If it is determined that the position does not correspond to a data recorded region (No at step E6), i.e., if the optical pickup head 11 is moved to a data unrecorded region, the disk determination unit 25a of the gain correction control circuit 25 instructs the pickup control circuit 22 to cause the track hold state. After that, the gain adjustment circuit 14 measures the amplitude A2 of the tracking error signal 13a from the analog computation circuit 13 when the optical pickup head 11 holds the track (step E7), and then compares the amplitude A2 with the previously measured amplitude A1 (step E8).

If the amplitude A1 is smaller than the amplitude A2 (A1<A2), it is determined that the reflectance of a laser beam is lower in the data recorded region than in the data unrecorded region (Yes at step E8). Namely, if the amplitude of the tracking error signal 13a in a track hold state increases after the optical pickup head 11 moves from the data recorded region to the data unrecorded region, it can be determined that the reflectance of a laser beam is lower in the data recorded region than in the data unrecorded region.

In this case, the disk determination unit 25a of the gain correction control circuit 25 determines that the optical disk 10 is the H-to-L disk. The gain control unit 25b decreases, by, for example, −2 [dB], the adjusted gain Na set at step E2 by automatic servo gain adjustment, and stores the corrected gain Na−2 [dB] in the gain-adjusting-value memory 14a for the data unrecorded region in the H-to-L disk. At the same time, the gain control unit 25b stores, in the gain-adjusting-value memory 14a, the adjusted gain Na temporarily stored in the gain-adjusting-value memory 14a at step E4, as gain data for the data recorded region in the H-to-L disk (step E9).

If it is determined at step E8 that the amplitude A1 is greater than the amplitude A2 (A1>A2), it is determined that the reflectance of a laser beam is higher in the data recorded region than in the data unrecorded region (No at step E8). Namely, if the amplitude of the tracking error signal 13a in a track hold state decreases after the optical pickup head 11 moves from the data recorded region to the data unrecorded region, it can be determined that the reflectance of a laser beam is higher in the data recorded region than in the data unrecorded region.

In this case, the disk determination unit 25a of the gain correction control circuit 25 determines that the optical disk 10 is the L-to-H disk. The gain control unit 25b increases, by, for example, +2 [dB], the adjusted gain Nc set at step E2 by automatic servo gain adjustment, and stores the corrected gain Nc+2 [dB] in the gain-adjusting-value memory 14a for the data unrecorded region in the L-to-H disk. At the same time, the gain control unit 25b stores, in the gain-adjusting-value memory 14a, the adjusted gain Nc temporarily stored in the gain-adjusting-value memory 14a at step E4, as gain data for the data recorded region in the L-to-H disk (step E10).

In contrast, if the region subjected to the automatic servo gain adjustment is a data unrecorded region (No at step E3), the gain control unit 25b of the gain correction control circuit 25 performs control to temporarily store, in the gain-adjusting-value memory 14a, the acquired adjusted gain (assume that it is Nb or Nd). Further, the disk determination unit 25a of the gain correction control circuit 25 instructs the pickup control circuit 22 to cause the optical pickup head 11 to perform tracking holding. The gain adjustment circuit 14 measures the amplitude A3 of the tracking error signal 13a from the analog computation circuit 13 when the optical pickup head 11 performs track holding, and stores it therein (step E11).

After that, the controller 16 drives the feed motor 34 via the feed motor driver 33 to move the optical pickup head 11 (step E12). At this time, the controller 16 determines, in the same manner as the above, whether the position at which the optical pickup head 11 emits a laser beam corresponds to a data recorded region or unrecorded region (step E13). The controller 16 moves the optical pickup head 11 until the data recorded region is detected, i.e., iterates steps E12 and E13. Instead of executing steps E12 and E13, monitoring may be performed during a normal operation until the data recorded region is detected.

In contrast, if the region subjected to the automatic servo gain adjustment is a data recorded region (Yes at step E13), the gain control unit 25b of the gain correction control circuit 25 instructs the pickup control circuit 22 to cause the optical pickup head 11 to perform track holding. The gain adjustment circuit 14 measures the amplitude A4 of the tracking error signal 13a from the analog computation circuit 13 when the optical pickup head 11 performs track holding (step E14). Further, the gain adjustment circuit 14 compares the amplitude A4 with the previously measured amplitude A3 (step E15).

If the amplitude A4 is greater than the amplitude A3 (A3<A4), it is determined that the reflectance of a laser beam is higher in the data recorded region than in the data unrecorded region (Yes at step E13). Namely, if the amplitude of the tracking error signal 13a in a track hold state increases after the optical pickup head 11 moves from the data unrecorded region to the data recorded region, it can be determined that the reflectance of a laser beam is higher in the data recorded region than in the data unrecorded region.

In this case, the disk determination unit 25a of the gain correction control circuit 25 determines that the optical disk 10 is the L-to-H disk. The gain control unit 25b decreases, by, for example, −2 [dB], the adjusted gain Nd set at step E2 by automatic servo gain adjustment, and stores the corrected gain Nd−2 [dB] in the gain-adjusting-value memory 14a for the data recorded region in the L-to-H disk. At the same time, the gain control unit 25b stores, in the gain-adjusting-value memory 14a, the adjusted gain Nd temporarily stored in the gain-adjusting-value memory 14a at step E11, as gain data for the data unrecorded region in the L-to-H disk (step E16).

Further, if the amplitude A4 is smaller than the amplitude A3 (A3>A4), it is determined that the reflectance of a laser beam is lower in the data recorded region than in the data unrecorded region (No at step E15). Namely, if the amplitude of the tracking error signal 13a in a track hold state decreases after the optical pickup head 11 moves from the data unrecorded region to the data recorded region, it can be determined that the reflectance of a laser beam is lower in the data recorded region than in the data unrecorded region.

In this case, the disk determination unit 25a of the gain correction control circuit 25 determines that the optical disk 10 is the H-to-L disk. The gain control unit 25b increases, by, for example, +2 [dB], the adjusted gain Nb set at step E2 by automatic servo gain adjustment, and stores the corrected gain Nb+2 [dB] in the gain-adjusting-value memory 14a for the data recorded region in the H-to-L disk. At the same time, the gain control unit 25b stores, in the gain-adjusting-value memory 14a, the adjusted gain Nb temporarily stored in the gain-adjusting-value memory 14a at step E10, as gain data for the data unrecorded region in the H-to-L disk (step E17). In the third embodiment, the reproduction process is executed in the same manner as in the first embodiment. Therefore, no description is given thereof.

In the third embodiment, the amplitudes of the tracking error signals 13a detected in both a data recorded region and unrecorded region by causing the optical pickup head 11 to perform track holding are compared with each other to determine whether the loaded optical disk is the H-to-L disk or L-to-H disk. However, another method can be used.

For instance, in the third embodiment, a tracking error signal 13a detected in a track hold state is utilized. Alternatively, the amplitude of a tracking error signal 13a detected after a laser beam emitted from the optical pickup head 11 is jumped to the same position after the optical pickup head 11 rotates through one circle may be compared.

Further, the optical disk can be identified by detecting the difference in the amplitude of the focusing error signal 13b, focusing sum signal 13e or wobble signal 13d between a data recorded region and unrecorded region.

Furthermore, disk determination using the difference in the amplitude of the focusing sum signal 13e or wobble signal 13d is effective when the boundary of the data recording region and unrecorded region is passed when a track is followed.

In addition, the optical disk 10 can be also determined to be the H-to-L disk or L-to-H disk by performing gain adjustment to set, to a preset value, the amplitude of the tracking error signal 13a (or focusing error signal 13b or the like) detected in each of the data recording region and unrecorded region, and comparing the adjusting values used for the gain adjustment. Namely, it can be determined that the region requiring a greater adjusting value has a lower reflectance.

As described above, in the third embodiment, the signals detected in the data recording region and unrecorded region are compared to determine whether the optical disk 10 is the H-to-L disk or L-to-H disk. This enables determination as to whether the optical disk 10 is the H-to-L disk or L-to-H disk, even if the optical disk 10 records no identification data, or identification data is not read or cannot be read, whereby appropriate adjusted gains for the data recording region and unrecorded region can be set.

In automatic servo gain adjustment performed in the first to third embodiments, if the wobble signal 13d and focusing sum signal 13e are subjected to gain adjustment, as well as the gain adjustment of the focusing error signal 13b and tracking error signal 13a, stable extraction of the wobble signal 13d and focusing sum signal 13e can be realized. The adjusted gains in this case are not always identical to those employed for the servo signals, but are set to appropriate values selected in accordance with the circuit configuration and/or control method employed. However, the way of gain adjustment is similar to the above-described one.

For instance, when the gains of the focusing error signal 13b and tracking error signal 13a are decreased, those of the wobble signal 13d and focusing sum signal 13e are also decreased. Further, when the gains of the focusing error signal 13b and tracking error signal 13a are increased, those of the wobble signal 13d and focusing sum signal 13e are also increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk device comprising:
an optical pickup head which emits a laser beam to an optical disk and detects light reflected from the optical disk;
a signal output unit configured to output at least a servo signal and an RF signal in accordance with the light detected by the optical pickup head;
a determination unit configured to determine whether the optical disk is an H-to-L disk in which a light reflectance is lower in a data recorded region than in a data unrecorded region or an L-to-H disk in which the light reflectance is higher in the data recorded region than in the data unrecorded region from identification information recorded on the optical disk;
a gain adjustment value memory which stores a gain adjustment value;
a gain control unit which is configured to:
set a first gain adjustment value Na in accordance with the H-to-L disk and the data recorded region of the gain adjustment value memory when it is determined by the determination unit that the optical disk is the H-to-L disk, arid the region to-be-read of the RF signal at the time of executing automatic servo gain adjustment is the data recorded region;
set a second gain adjustment value Nb (Nb<Na) in accordance with the H-to-L disk and the data unrecorded region of the gain adjustment value memory when it is determined by the determination unit that the optical disk is the H-to-L disk, and the region to-be-read of the RF signal at the time of executing the automatic servo gain adjustment is the data unrecorded region;
set a third gain adjustment value Nc in accordance with the H-to-L disk and the data recorded region of the gain adjustment value memory when it is determined by the determination unit that the optical disk is the L-to-H disk, and the region to-be-read of the RF signal at the time of executing the automatic servo gain adjustment is the data recorded region; and
set a fourth gain adjustment value Nd (Nd>Nc) in accordance with the L-to-H disk and the data unrecorded region of the gain adjustment value memory when it is determined by the determination unit that the optical disk is the L-to-H disk, and the region to-be-read of the RF signal at the time of executing the automatic servo gain adjustment is the data unrecorded region; and
a gain adjustment unit configured to execute automatic servo gain adjustment of the servo signal by using the first, second, third, or fourth adjusted gains set in the servo gain adjustment memory, according to the type of the optical disk and whether the region is the data recorded region or the data unrecorded region in reproducing the optical disk.

2. An optical disk device comprising:
an optical pickup head which emits a laser beam to an optical disk and detects light reflected from the optical disk;
a signal output unit configured to output at least a servo signal and an RF signal in accordance with the light detected by the optical pickup head;
a determination unit configured to determine whether the optical disk is the H-to-L disk in which a light reflectance is lower in a data recorded region than in a data unrecorded region or the L-to-H disk in which the light reflectance is higher in the data recorded region than in the data unrecorded region from identification information recorded on the optical disk;
a gain adjustment value memory which stores a gain adjustment value;
a gain control unit which is configured to:
set a first middle gain adjustment value Nab, which is intermediate between a first gain adjustment value Na and a second gain adjustment value Nb (Nb<Na), in accordance with the H-to-L disk and the data recorded region of the gain adjustment value memory when it is determined by the determination unit that the optical disk is the H-to-L disk, and the region to-be-read of the RF signal at the time of executing automatic servo gain adjustment is the data recorded region;
set the first middle gain adjustment value Nab, which is intermediate between the first gain adjustment value Na and the second gain adjustment value Nb (Nb<Na), in accordance with the H-to-L disk and the data unrecorded region of the gain adjustment value memory when it is determined by the determination unit that the optical disk is the H-to-L disk, and the region to-be-read of the RF signal at the time of executing the automatic servo gain adjustment is the data unrecorded region;
set a second middle gain adjustment value Ncd, which Is intermediate between a third gain adjustment value Nc and a fourth gain adjustment value Nd (Nd>Nc), in accordance with the L-to-H disk and the data recorded region of the gain adjustment value memory when it is determined by the determination unit that the optical disk is the L-to-H disk, and the region to-be-read of the RF signal at the time of executing the automatic servo gain adjustment is the data recorded region; and set the second middle gain adjustment value Ncd, which is intermediate between the third gain adjustment value Nc and the fourth gain adjustment value Nd (Nd>Nc), in accordance with the L-to-H disk and the data unrecorded region of the gain adjustment value memory when it is determined by the determination unit that the optical disk is the L-to-H disk, and the region to-be-read of the RF signal at the time of executing the automatic servo gain adjustment is the data unrecorded region; and a gain adjustment unit configured to execute gain adjustment of the servo signal, in reproducing the optical disk, by using one of:

a value which is obtained by adding a fixed value to the first middle gain adjustment value Nab set in the gain adjustment value memory, when it is determined that the optical disk is the H-to-L disk, and reproduction is performed based on the data recorded region;

a value which is obtained by subtracting a fixed value from the first middle gain adjustment value Nab set in the gain adjustment value memory, when it is determined that the optical disk is the H-to-L disk, and the reproduction is performed based on the data unrecorded region;

a value which is obtained by subtracting a fixed value from the second middle gain adjustment value Ncd set in the gain adjustment value memory, when it is determined that the optical disk is the L-to-H disk, and the reproduction is performed based on the data recorded region; and a value which is obtained by adding a fixed value to the second middle gain adjustment value Ncd set in the gain adjustment value memory, when it is determined that the optical disk is the L-to-H disk, and the reproduction is performed based on the data unrecorded region.

3. An optical disk device comprising:

an optical pickup head which emits a laser beam to an optical disk and detects light reflected from the optical disk;

a pickup control unit configured to cause the optical pickup head to perform track holding on the optical disk;

a signal output unit configured to output at least a servo signal including a tracking error signal, and an RF signal in accordance with the light detected by the optical pickup head;

a determination unit which is configured to:

determine that the optical disk is the H-to-L disk when the region in which automatic servo gain adjustment is performed is a data recorded region and a first amplitude of a first tracking error signal is smaller than a second amplitude of a second tracking error signal as a result of comparison between the first amplitude of the first tracking error signal, which is assumed when the pickup control unit causes the optical pickup head to perform track holding in the data recorded region, and the second amplitude of the second tracking error signal, which is assumed when the optical pickup head moved to the data unrecorded region performs track holding, and determine that the optical disk is the H-to-L disk when the first amplitude of the first tracking error signal is larger than the second amplitude of the second tracking error signal; and determine that the optical disk is the L-to-H disk when the region in which the automatic servo gain adjustment is performed is the data unrecorded region and a fourth amplitude of a fourth tracking error signal is larger than a third amplitude of a third tracking error signal as a result of comparison between the third amplitude of the third tracking error signal, which is assumed when the pickup control unit causes the optical pickup head to perform track holding in the data unrecorded region, and the fourth amplitude of the fourth tracking error signal, which is assumed when the optical pickup head moved to the data recorded region performs track holding, and determine that the optical disk is the H-to-L disk when the fourth amplitude of the fourth tracking error signal is smaller than the third amplitude of the third tracking error signal;

a gain adjustment value memory which stores a gain adjustment value;

a gain control unit which is configured to:

set a first gain adjustment value Na in accordance with the H-to-L disk and the data recorded region of the gain adjustment value memory when it is determined by the determination unit that the optical disk is the H-to-L disk, and the region to-be-read of the RF signal at the time of executing automatic servo gain adjustment is the data recorded region;

set a second gain adjustment value Nb (Nb<Na) in accordance with the H-to-L disk and the data unrecorded region of the gain adjustment value memory when it is determined by the determination unit that the optical disk is the H-to-L disk, and the region to-be-read of the RF signal at the time of executing the automatic servo gain adjustment is the data unrecorded region;

set a third gain adjustment value Nc in accordance with the L-to-H disk and the data recorded region of the gain adjustment value memory when it is determined by the determination unit that the optical disk is the L-to-H disk, and the region to-be-read of the RF signal at the time of executing the automatic servo gain adjustment is the data recorded region; and set a fourth gain adjustment value Nd (Nd>Nc) in accordance with the L-to-H disk and the data unrecorded region of the gain adjustment value memory when it is determined by the determination unit that the optical disk is the L-to-H disk, and the region to-be-read of the RF signal at the time of executing the automatic servo gain adjustment is the data unrecorded region; and a gain adjustment unit configured to execute automatic servo gain adjustment of the servo signal by using the first, second, third, or fourth gain adjustment value set in the gain adjustment value memory, according to the type of the optical disk and whether the region is the data recorded region or the data unrecorded region in reproducing the optical disk.

4. A gain adjustment method for an optical disk device, comprising:

emitting a laser beam from an optical pickup head to an optical disk to read identification information recorded on the optical disk, and determining whether a type of the optical disk is the H-to-L disk in which a light reflectance is lower in a data recorded region than in a data unrecorded region or the L-to-H disk in which the light reflectance is higher in the data recorded region than in the data unrecorded region;

setting a first gain adjustment value Na in accordance with the H-to-L disk and the data recorded region of a gain adjustment value memory when it is determined that the optical disk is the H-to-L disk by the determining, and the region to-be-read of an RF signal at the time of executing automatic servo gain adjustment is the data recorded region;

setting a second a gain adjustment value Nb (Nb<Na) in accordance with the H-to-L disk and the data unrecorded region of the gain adjustment value memory when it is determined that the optical disk is the H-to-L disk by the determining, and the region to-be-read of the RF signal at the time of executing the automatic servo gain adjustment is the data unrecorded region;

setting a third gain adjustment value Nc in accordance with the L-to-H disk and the data recorded region of the gain adjustment value memory when it is determined that the optical disk is the L-to-H disk by the determining, and the region to-be-read of the RF signal at the time of executing the automatic servo gain adjustment is the data recorded region;

setting a fourth gain adjustment value Nd (Nd>Nc) in accordance with the L-to-H disk and the data unrecorded region of the gain adjustment value memory when it is determined that the optical disk is the L-to-H disk by the determining, and the region to-be-read of the RF signal at the time of executing the automatic servo gain adjustment is the data unrecorded region; and executing servo gain adjustment of a servo signal by using the first, second, third, or fourth gain adjustment value set in the gain adjustment value memory, according to the type of the optical disk and whether the region is the data recorded region or the data unrecorded region in reproducing the optical disk.

5. A gain adjustment method for an optical disk device, comprising:

emitting a laser beam from an optical pickup head to an optical disk;

reading identification information recorded on the optical disk and determining whether a type of the optical disk is the H-to-L disk in which a light reflectance is lower in a data recorded region than in a data unrecorded region or the L-to-H disk in which the light reflectance is higher in the data recorded region than in the data unrecorded region;

setting a first middle gain adjustment value Nab, which is intermediate between a first gain adjustment value Na and a second gain adjustment value Nb (Nb<Na), in accordance with the H-to-L disk and the data recorded region of a gain adjustment value memory when it is determined that the optical disk is the H-to-L disk by the determining, and the region to-be-read of an RF signal at the time of executing automatic servo gain adjustment is the data recorded region;

setting the first middle gain adjustment value Nab, which is intermediate between the first gain adjustment value Na and the second gain adjustment value Nb (Nb<Na), in accordance with the H-to-L disk and the data unrecorded region of the gain adjustment value memory when it is determined that the optical disk is the H-to-L disk by the determining, and the region to-be-read of the RF signal at the time of executing the automatic servo gain adjustment is the data unrecorded region;

setting a second middle gain adjustment value Ncd, which is intermediate between a third gain adjustment value NC and a fourth gain adjustment value Nd (Nd>Nc), in accordance with the L-to-H disk and the data recorded region of the gain adjustment value memory when it is determined that the optical disk is the L-to-H disk by the determining, and the region to-be-read of the RF signal at the time of executing the automatic servo gain adjustment is the data recorded region;

setting the second middle gain adjustment value Ncd, which is intermediate between the third gain adjustment value Nc and the fourth gain adjustment value Nd (Nd>Nc), in accordance with the L-to-H disk and the data unrecorded region of the gain adjustment value memory when it is determined that the optical disk is the L-to-H disk by the determining, and the region to-be-read of the RF signal at the time of executing the automatic servo gain adjustment is the data unrecorded region; and executing, at the time of reproducing the optical disk, automatic servo gain adjustment of a servo signal by using, a value which is obtained by adding a fixed value to the first middle gain adjustment value Nab set in the gain adjustment value memory, when it is determined that the optical disk is the H-to-L disk, and reproduction is performed based on the data recorded region;

a value which is obtained by subtracting a fixed value from the first middle gain adjustment value Nab set in the gain adjustment value memory, when it is determined that the optical disk is the H-to-L disk, and the reproduction is performed based on the data unrecorded region;

a value which is obtained by subtracting a fixed value from the second middle gain adjustment value Ncd set in the gain adjustment value memory, when it is determined that the optical disk is the L-to-H disk, and the reproduction is performed based on the data recorded region; or a value which is obtained by adding a fixed value to the second middle gain adjustment value Ncd set in the gain adjustment value memory, when it is determined that the optical disk is the L-to-H disk, and the reproduction is performed based on the data unrecorded region.

6. A gain adjustment method for an optical disk device, comprising:

emitting a laser beam from an optical pickup head to an optical disk;

obtaining a first amplitude of a first tracking error signal in a state where the region to-be-read of an RF signal at the time of executing automatic servo gain adjustment is a data recorded region, and the optical pickup head performs track holding in the data recorded region;

obtaining a second amplitude of a second tracking error signal in a state where the optical pickup head moved to a data unrecorded region thereafter performs track holding in the data unrecorded region;

comparing the first amplitude of the first tracking error signal with the second amplitude of the second tracking error signal, and determining that the optical disk is the H-to-L disk when the first amplitude of the first tracking error signal is smaller than the second amplitude of the second tracking error signal, and that the optical disk is the L-to-H disk when the first amplitude of the first tracking error signal is larger than the second amplitude of the second tracking error signal;

comparing a third amplitude of a third tracking error signal, which is assumed in a state where the to-be-read region of the RF signal at the time of executing the automatic servo gain adjustment is the data unrecorded region, and the optical pickup head performs track holding in the data unrecorded region, with a fourth amplitude of a fourth tracking error signal, which is assumed in a state where the optical pickup head moved to the data recorded region performs track holding in the data recorded region, and determining that the optical disk is the L-to-H disk when the fourth amplitude of the fourth tracking error signal is larger than the third amplitude of the third tracking error signal, and that the optical disk is the H-to-L disk when the fourth amplitude of the fourth tracking error signal is smaller than the third amplitude of the third tracking error signal;

setting a first gain adjustment value Na in accordance with the H-to-L disk and the data recorded region of a gain adjustment value memory when it is determined that the optical disk is the H-to-L disk by the determining, and the region to-be-read of the RF signal at the time of executing the automatic servo gain adjustment is the data recorded region;

setting a second gain adjustment value Nb (Nb<Na) in accordance with the H-to-L disk and the data unrecorded region of the gain adjustment value memory when it is determined that the optical disk is the H-to-L disk by the determining, and the region to-be-read of the RF signal at the time of executing the automatic servo gain adjustment is the data unrecorded region;

setting a third gain adjustment value Nc in accordance with the L-to-H disk and the data recorded region of the gain adjustment value memory when it is determined that the optical disk is the L-to-H disk by the determining, and the region to-be-read of the RF signal at the time of executing the automatic servo gain adjustment is the data recorded region;

setting a fourth gain adjustment value Nd (Nd>Nc) in accordance with the L-to-H disk and the data unrecorded region of the gain adjustment value memory when it is determined that the optical disk is the L-to-H disk by the determining, and the region to-be-read of the RF signal at the time of executing the automatic servo gain adjustment is the data unrecorded region; and executing automatic servo gain adjustment of a servo signal by using the first, second, third, or fourth adjusted gain, which has been set in the gain adjustment value memory, according to the type of the optical disk and whether the region is the data recorded region or the data unrecorded region in reproducing the optical disk.

* * * * *